United States Patent [19]

Bahr et al.

[11] 4,163,285
[45] Jul. 31, 1979

[54] CONTROL CIRCUIT FOR METAL PAPER PRINTER HEAD

[75] Inventors: Dietrich J. Bahr; Karl H. Burckardt, both of Herrenberg; Helmut Hasselmeier, Aidlingen, all of Fed. Rep. of Germany

[73] Assignee: International Business Machines Corporation, Armonk, N.Y.

[21] Appl. No.: 867,392

[22] Filed: Jan. 6, 1978

[30] Foreign Application Priority Data

Apr. 9, 1977 [DE] Fed. Rep. of Germany ....... 2715889

[51] Int. Cl.² ............................................. G06F 3/12
[52] U.S. Cl. ................................ 364/710; 101/93.04; 364/900
[58] Field of Search .................... 364/710, 200, 900; 101/93.04, 93.05

[56] References Cited

U.S. PATENT DOCUMENTS

| | | | |
|---|---|---|---|
| 3,909,626 | 9/1975 | Balasubramanian et al. | 364/710 |
| 3,986,011 | 10/1976 | Poole et al. | 364/200 X |
| 4,024,506 | 5/1977 | Spaargaren | 101/93.04 X |

*Primary Examiner*—David H. Malzahn
*Attorney, Agent, or Firm*—Kenneth P. Johnson

[57] ABSTRACT

Control circuit for a print head of a metal paper printer in which electrodes are arranged on a slope, said electrodes being staggered in horizontal projection by the D-fold of their electrode width. The martrix-like structurized character to be printed consists of individual image elements stored in a main storage. This character information is read out column-by-column and written into predetermined locations of a read/write buffer storage. The write phase is followed by a readout phase of predetermined locations of the buffer storage for the direct addressing of the electrodes of the writing head. Write and read phases alternate. For determining the address of the storage locations during the write and read phases two counters are used in connection with a multiplier and an adder as well as a register for storing the D-value.

6 Claims, 4 Drawing Figures

CONTROL CIRCUIT FOR METAL PAPER PRINTER HEAD

BACKGROUND OF THE INVENTION

The invention relates to a circuit for controlling a printing head with electrodes that are arranged on a slope. This printing head serves for writing on metal paper. It is guided over the paper in print line direction, with the printing head electrodes touching the surface of the metal paper. If a printing voltage is applied at predetermined times the metal paper is burnt out at the contact surface with these activated electrodes, and an optically visible image is obtained.

The information that is to be supplied to the printing head can be stored in a host computer with a main storage. This information is generally stored in such a manner that it can be employed for controlling a printing head with electrodes placed one above the other, but not for a printing head with electrodes arranged on a slope. According to standard considerations the information read out of the main storage column-by-column has to be applied, for a printing head with electrodes arranged on a slope, to said printing head with a delay depending on the respective row of character elements.

The term row of character elements means that a character has a matrix-like structure, i.e. that a character extends over several adjacent columns of elements in one coordinate direction, and over several rows of elements arranged one over the other, in the other coordinate direction.

According to conventional consideration in a metallized paper printer, the controlling of the electrodes on a slope would require shift registers of different lengths which in their number correspond to the number of electrodes (see also detailed explanation of FIGS. 1 and 3). This, however, would involve extensive circuitry.

In order to avoid this disadvantage it is the object of the invention to provide a control circuit for a printing head of a metal paper printer which requires a low amount of circuitry and is universally applicable for printing heads with different electrode staggering.

SUMMARY OF THE INVENTION

The foregoing object is accomplished in accordance with this invention by providing a buffer storage into which a column of character data from a main store is serially written in rows corresponding to the print head element to be controlled and in columns corresponding to element spacing or D-factor along the print line. Read-in and read-out of the buffer store occurs alternately for the data from the main store. Addressing of the buffer is controlled through a row counter, which repetitively cycles through a count necessary to address all rows, a second counter advanced by every second cycle of the row counter through a flip-flop, which serves to provide a column address, a multiplier circuit, which multiplies the row count by a selectable fixed D-factor to form a product that addresses buffer columns in advance of and corresponding with the print head element staggering, and an adder, which adds the multiplier product and second counter count to address the correct buffer columns. During readout, the flip-flop in one of the states disables the multiplier so that the second counter output addresses the column for readout.

The foregoing and other objects, features, and advantages of the invention will be apparent in the following more particular description of a preferred embodiment of the invention, as illustrated in the accompanying drawings.

BRIEF DESCRIPTION OF THE DRAWINGS

An embodiment of the invention is shown in the drawings and will be explained in detail below. The figures show the following.

DESCRIPTION OF THE PREFERRED EMBODIMENT

Figure 1:
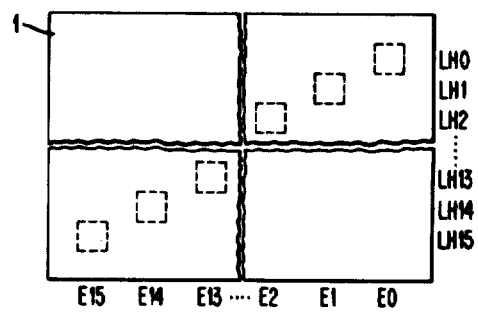
FIG. 1 is a schematic representation of a printing head for a metal paper printer having several electrodes arranged on a slope, and with which the invention may be used.

FIG. 1 shows a printing head 1 for a metallized paper printer having several electrodes, E0, E1, E2 to E15 arranged on a slope. Electrodes E0 to E15 are staggered horizontally and vertically. In the illustrated embodiment the horizontal staggering (e.g. for electrodes with a square cross-section) corresponds to twice the amount of the electrode dimensions. Each electrode has one associated respective row: electrode E0 is provided in row LH0, electrode E1 in row LH1, electrode E2 in row LH2, and electrode E3 in row LH3, etc. In this embodiment sixteen electrodes E0 to E15 are provided.

Figure 2:
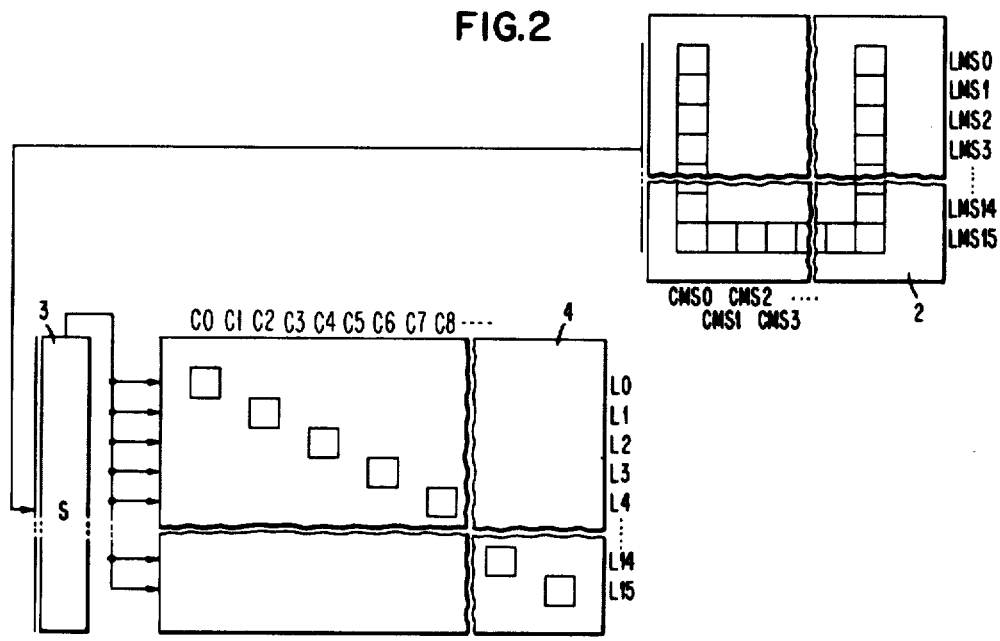
FIG. 2 is a schematic representation for the transfer of information that is to be printed and that is stored in a main storage, via a parallel/series converter, into a write/read buffer storage.
Figure 3:
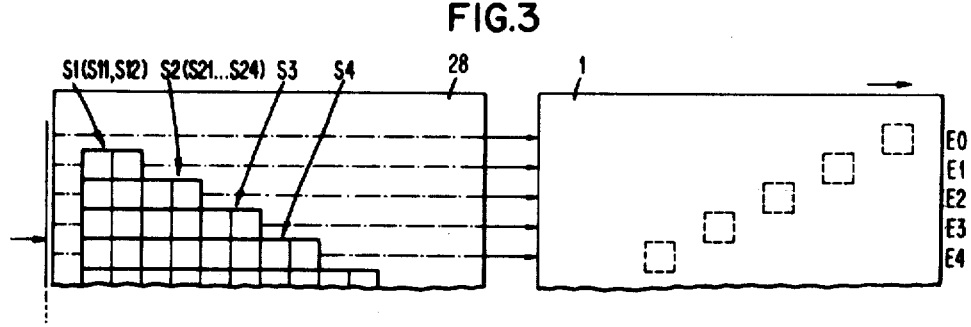
FIG. 3 is a schematic representation of a shift register arrangement for controlling a printing head for a metal paper printer with several electrodes arranged on a slope.

The following will describe how recording is done in accordance with conventional considerations when using a printing head with electrodes arranged on a slope. It is assumed that the information to be printed is first stored in a main storage of a host computer. FIG. 2 shows schematically, for example, the storage of the letter U in main storage 2 of the host computer. In order to simplify representation and description it is assumed that the individual elements of this character are associated in a matrix-like structure subdivided into character columns and rows. According to the drawing, the character U has character element rows LMS0 through LMS15, and character element columns CMS0, CMS1, CMS2, etc. It is assumed that the information is read out of the main storage by columns. This means that during a first read-out clock the information of column CMS0 is read out, then during a second output clock the information of column CMS1, etc. This information is applied clock-by-clock to a shift register arrangement 28 as shown in FIG. 3. This shift register arrangement comprises as many shift registers S1, S2, S3, etc. as there are character element rows LMS1 to LMS15 in main storage 2.

Each character element row has a specific associated shift register. Row LMS0 would have associated the non-existent shift register S0 (no stages), row LMS1 has shift register S1 consisting of two stages S11 and S12, row LMS2 has shift register S2 consisting of four stages S21, S22, S23, and S24, etc. The information read out of main storage 2 in character columns is applied via corresponding lines to the inputs of the individual shift registers S1 to S15. This information is moved clock-by-clock through the individual shift register stages. When leaving the last stage of a shift register, the information reaches the electrode associated with this shift register. Electrode E0 does not have an associated shift register so that the information from the main storage for element CMS0, LMS0 is received at once during the first read-out clock. The information of character element CMS0, LMS1 is received by electrode E1 only after two clocks after it has passed through shift register stages S11 and S12 of shift register S1. Accordingly, the information of character element CMS0, LMS2 from main storage 2 is applied to electrode E2 after four clocks after having passed through shift register stages S21, S22, S23, and S24 of shift register S2, etc.

It can easily be concluded from the configuration of printing head 1 where the individual electrodes are horizontally staggered by two electrode widths with respect to each other, that e.g., for printing a straight vertical line, such as the left leg of the character U stored in main storage 2, the electrodes have to be activated at different times. It is assumed that printing head 1 advances with each clock by one electrode width. If therefore electrode E0, at the time of the first clock, is activated for a printing operation and produces a corresponding print, electrode E1, upon the advance of the printing head in arrow direction after two further clocks, is beneath said print produced earlier by electrode E0. At this moment electrode E1 is to be energized. This is ensured in that the information of character element CMS0, LMS1 read into step S11 of shift register 1 during the first clock, has been shifted during the second clock into shift register element S12 of shift register 1, and in that this information during the subsequent clock is applied to electrode E1. This means that electrode E1 receives its control information with a delay of two clocks after electrode E0. Corresponding delays are to be considered in the control of all other electrodes. The increase of the shift register length by two respective stages from shift register to shift register is due to the horizontal electrode staggering in the printing head arrangement by two electrode widths. If this mutual electrode staggering were greater, e.g. three electrode widths, the individual shift registers would have to differ in their length by three respective shift register stages.

If therefore electrode E0 produces a print during the first clock, under which print electrode E1 will produce another print two clocks later this process can be assumed to be continued analogously to the statements made above. When the printing head moves on, electrode E2 is after the second clock under the print which had been produced before the electrodes E0 and E1. At this time, electrode E2 receives its control data so that it successively completes in this manner the reproducing of the left leg of the character U as a vertical perpendicular line.

There will now be described by means of FIG. 2, the manner, according to the invention, of reading information from main storage 2 via a parallel-series converter 3 into a write/read buffer storage 4 addressable by row and column, and then applying it to control the electrodes of the printing head.

The information of main storage 2 is read out columnwise in parallel, and written via parallel-series converter 3 in predetermined positions of write/read buffer storage 4. This storage 4 has a matrix-like structure which is characterized by columns C0, C1, C2 etc. and by rows L0, L1, L2 to L15. Each position of storage 4 is addressable by column and row. The embodiment of this storage is limited to sixteen rows, i.e. rows L0 to L15. This storage shows as many rows as there are different electrodes E0 to E15 (FIG. 1). Electrode E0 is associated with row L0 of storage 4, electrode E1 with row L1, electrode E2 with row L2, etc. The operation of the storage can be divided into different phases:

First phase: writing-in of the information supplied by parallel-series converter 3 for the information read out of main storage 2, of the first column CMS0 to predetermined positions of storage 4. Addressing of these positions will be described hereinafter.

Second phase: reading-out of the information from column C0 of storage 4 for the direct control of the individual electrodes of the printing head. The control information for electrode E0 is contained in position column C0, row L0; for electrode E1 it is in the position column C0, row L1; for electrode E2 it is in the position column C0, row L2, etc.

Third phase: reading-out of the information of column CMS1 of main storage 2 into parallel-series converter 3, and writing-in of this information in predetermined positions of storage 4.

Fourth phase: reading-out of the information from column C1 of storage 4 for the direct controlling of the electrodes in the printing head. Analogously to the statements given above, the control information for electrode E0 is in the position column C1, row L0; for electrode E1 it is in the position column C1, row L1; for electrode E2 it is in the position column C1, row L2, etc.

Fifth phase: reading-out of the information from column CMS2 from main storage 2 into parallel-series converter 3, and transfer of this information to specific positions of storage 4.

Sixth phase: reading-out of the information from column C2 of storage 4 for the direct control of the electrodes of the printing head, etc.

In this manner, the phases of writing in column information from main storage 2 into storage 4 alternate with phases of reading out the information from consecutively ascending columns of storage 4 for controlling the electrodes of the printing head. The addressing of storage 4 depends on a factor D. This factor D designates the horizontal staggering of the individual electrodes in the printing head. In the embodiment according to FIG. 1 the horizontal staggering of the individual electrodes is D=2, i.e. electrode E1 is horizontally staggered relative to electrode E0 by D=two electrode widths, electrode E2 is staggered relative to electrode E1 by D=two electrode widths, etc., so that in such a configuration there is between the individual electrodes a distance projected into the horizontal of one electrode width.

For the sake of simplicity the representation of the embodiment shows a factor D=2. In practical cases this factor will be higher in order to achieve a better contact for heads with a high resolution between the individual electrodes and the rough paper surface.

This factor D is decisive for the addressing of the storage. In the case of the respective embodiment the information for the vertical "line" read out of column CMS0 of main storage 2 is written at the shaded parts of storage 4. The arrangement of these marked parts practically corresponds to the mirror-image representation of the arrangement of the electrodes in the printing head. This is all the more obvious because when this information stored in such a manner in the printing head is reproduced, a straight line is to be printed via the printing head of FIG. 1, according to column information CMS0 in main storage 2. For that purpose—if this process is considered separately with respect to time—the individual columns are read out in the order C0, C1, C2, C3, C4, etc. of storage 4, and the information contained therein is supplied via the printing head electrodes associated with the respective rows, i.e. the point marked in the position column C0, row L0 is emitted as a printing element via printing head electrode E0. Then the printing head moves on by one electrode width; for this position column C1 of storage 4 is read out. However, no information is contained therein so that none of the printing head electrodes are energized. Subsequently, the printing head again moves on by one electrode width so that electrode E1 is under the position of the printing element which previously had been generated by electrode E0. At this moment, electrode E1 is activated via the information in the position column C2, row L1 to supply a printing element, etc.

In this manner, a straight vertical line is printed during successive printing phases by means of electrodes E0 to E15, in accordance with the information in column CMS0 of main storage 2.

Figure 4:
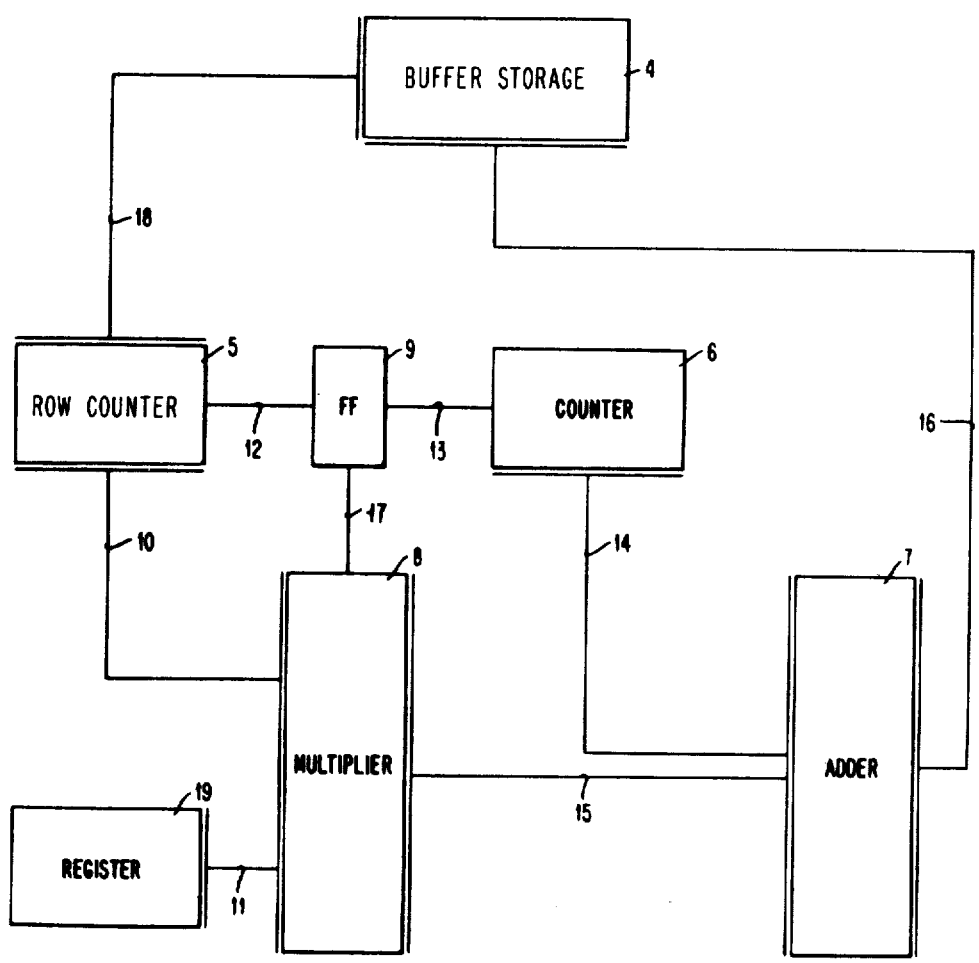
FIG. 4 is a schematic block wiring diagram of the control circuit in accordance with the invention for the printing head of a metal paper printer, with electrodes arranged on a slope.

For an electrode arrangement with a different factor D the addressing of the positions of storage 4 would be modified accordingly. For addressing storage 4 during the individual phases a row counter 5 and a counter 6 are provided (FIG. 4). For addressing the columns an adder 7 is also provided during the odd phases.

The addressing of buffer storage 4 during the individual phases, for the embodiment according to FIG. 1 will now be described. Row counter 5 is a cyclically operating binary counter with four stages (corresponding to the sixteen electrodes selected). If the information bits supplied via the parallel-series converter during a phase, have to be written into respective positions of storage 4, counter 5 receives successively for each of the bits to be entered into storage 4 (according to the sixteen electrodes selected there are consequently sixteen bits) a counting pulse, i.e. during a "write" phase row counter 5 receives sixteen pulses. Its count designates the addressed row of storage 4.

For generating the column address, counter 6 operates together with a register 19 for the D factor (in this case D=2), a multiplier 8, and an adder 7. Multiplier 8 generates a product of factor D and the count of counter 5. This product is added up to form a sum with the count of counter 6 via adder 7. This sum indicates the addressed column position of storage 4.

Counter 6 is a cyclically operating binary counter, being incremented by one when row counter 5 has terminated a two-fold cycle. After one cycle, counter 5 emits a pulse to a flip-flop 9. This flip-flop 9 supplies an output pulse to counter 6 when it has received two input pulses from row counter 5. For a more detailed explanation of the addressing, the counts of counters 5 and 6 are given for the individual pulses within the phases in Table I.

TABLE I

|  |  | Time | Count Counter 5 | Count Counter 6 |
|---|---|---|---|---|
| 1st phase | output value | T0 | 0 | 0 |

TABLE I-continued

|  |  | Time | Count Counter 5 | Count Counter 6 |
|---|---|---|---|---|
|  | pulse 1 | T1 | 1 | 0 |
|  | pulse 2 | T2 | 2 | 0 |
|  | pulse 3 | T3 | 3 | 0 |
|  | . | . | . | . |
|  | . | . | . | . |
|  | pulse 14 | T14 | 14 | 0 |
|  | pulse 15 | T15 | 15 | 0 |
| 2nd phase | pulse 0 | T0 | 0 | 0 |
|  | pulse 1 | T1 | 1 | 0 |
|  | pulse 2 | T2 | 2 | 0 |
|  | pulse 3 | T3 | 3 | 0 |
|  | . | . | . | . |
|  | pulse 14 | T14 | 14 | 0 |
|  | pulse 15 | T15 | 15 | 0 |
| 3rd phase | pulse 0 | T0 | 0 | 1 |
|  | pulse 1 | T1 | 1 | 1 |
|  | pulse 2 | T2 | 2 | 1 |
|  | pulse 3 | T3 | 3 | 1 |
|  | . | . | . | . |
|  | pulse 14 | T14 | 14 | 1 |
|  | pulse 15 | T15 | 15 | 1 |

In consideration of these data the address determination for the positions in storage 4 during the individual phases will now be specified.

First Phase: It is once more emphasized that the information from column CMS0 of main storage 2 is bit-serially entered into storage 4. Each element of this column CMS0 has one of electrodes E0 to E15 associated thereto. Accordingly, these elements are written into rows L0 to L15 of storage 4. A specific feature appears merely in the determination of the column address. Column element CMS0, LMS0 associated to electrode E0 and belonging to main storage 2 is always written into the position row L0, column C0 of storage 4. The column addresses for all other elements of column CMS0 which are successively written into storage 4 are obtained by means of an address calculation.

This address calculation is based on the following relation: Column address=count of column 6+factor D count of counter 5. (This relation always applies to a specific time T0 to T15 within a phase). The counts at the various times T0 to T15 are given in Table 1.

Register 19 continuously contains factor D (in the embodiment D=2). The product of D times the count of counter 5 is produced by multiplication circuit 8. The result of the multiplication is added by adder 7 to the count to counter 6. The result of this addition is the column address under which, with the row address given by counter 5, the information of the respective element is to be written into storage 4 at a predetermined time.

Example: The third character element CMS0, LMS2 of main storage 2 is to be written into storage 4 at time T2 of the first phase. The row address is determined by the fixed association as row L2. It corresponds to the count of counter 5 at time T2 in the first phase. The column address is calculated according to the given formula as follows: column address=0+2·2=4. Thus, the information for element CMS0, LMS2 is to be written in row L2, column C4 in storage 4, recalling that column numbers start at 0. For the fifteenth column element CMS0, LMS14 of main storage 2 there would be at time T14 a column address of 0+2·14=28.

Second Phase: After the writing-in of the information of column CMS0 from main storage 2 via parallel-series converter 3 into storage 4 during the first phase there follows in the second phase the reading-out of the information from storage 4 for controlling the electrodes of the printing head.

In phase 2, only column C0 is read out. The addressing required for that purpose takes place via row counter 5 and counter 6 without further address modification, i.e. at time T0 the position row L0, column C0 is read out in accordance with the counts at these times, at time T1 the position of row L1, column C0 according to the counts at this time, etc., until at time T15 the position row L15, column C0 is read out.

Third Phase: In the third phase following this second phase column CMS1 is read out of main storage 2 and bit-serially written into storage 4. The addressing of the various positions again takes place via row counter 5 and counter 6 in consideration of the address modification, as already described during the first phase. If therefore during time T0 the uppermost column element CMS1, LMS0 of main storage 2 is to be written into a corresponding position of storage 4 the address of this position is calculated as follows:

row address = 0
(0 corresponds to the count of counter 5 at time T0)
column address = 1 + 2·0 = 1
(count of counter 5 at time T0 = 1; D = 2; and count of counter 5 at time T0 = 0)
Consequently an address of row 0 and column 1 is obtained, i.e. L0; C1. The calculation of the other positions is carried out analogously.

Fourth Phase: In the fourth phase following the third phase storage 4 is again read out for controlling the electrodes of the printing head. The addresses of the individual positions to be read out are again obtained from the counts of counter 5 for the row address and counter 6 for the column address at the individual times T0 to T15. During this phase, analogously to the second phase, there is no address modification, either, for the column address. During the fourth phase the information of column C1 of storage 4 is read out for controlling the electrodes.

Fifth Phase: Writing of the information of column CMS2 from main storage 2 into predetermined positions of storage 4 in accordance with the relation given in the first phase.

Sixth Phase: Reading out the information of column C2 of storage 4 for controlling the electrodes, etc.

In this manner, the writing-in of information from main storage 2 into storage 4, and the reading-out of information (from column to column) from storage 4 for controlling the electrodes alternate during the individual phases. As counters 5 and 6 operate cyclically it is ensured that after the addressing of the last storage position in storage 4 the counting process starts again at row L0, column C0.

In order to make sure that during the transfer of the information from main storage 2 into storage 4 no information is lost, this storage 4 has to show a predetermined number of columns. The minimum number of columns is calculated by the relation: $M \geq (n-1) \cdot D$, M being the minimum number of columns, n the number of electrodes in the electrode printing head, and D the already defined "stagger" factor. It is pointed out that the circuit in accordance with the invention can be realized with low-priced standard circuits. For storage 4 a simple one-bit storage addressable in rows and columns can be employed; for counters 5 and 6 a simple cyclically operating binary counter, for address modification simple multiplication and adding circuits available commercially.

In the addressing circuit for the writing-in and reading-out of storage 4 in accordance with FIG. 4 the individual functional blocks and their interconnections are represented schematically. The address decoding circuits for counter 5 and adder circuit 7 supplying the binary coded addresses are not shown.

Row counter 5 is connected to storage 4 via lines 18 for row addressing. Besides, row counter 5 is connected via lines 10 to multiplication circuit 8 whose second input is connected via lines 11 to register 19. After one cycle of counter 5 the counter supplies a pulse via line 12 to flip-flop 9. This circuit is connected on the one hand to counter 6 via line 13, counter 6 receiving via this line, after two pulses have been applied on flip-flop 9, a counting pulse via line 12. The count of counter 6 is applied via lines 14 to an adder 7 whose second input is connected via lines 15 to the output of multiplication circuit 8. The output lines 16 of adder 7 are connected to storage 4 for column addressing.

For switching from one phase to the next one, flip-flop 9 is connected to multiplication circuit 8 via line 17. For all even phases there is no address calculation, i.e. in these phases there is to be no product generation between the count of counter 5 and the D factor of register 19. This is effected in that flip-flop 9 alternatively switches on and off (setting the product output to zero) the multiplication circuit after the individual cycles of counter 5. Row counter 5 receives its input pulse from those pulses which also clock (not shown) the parallel-series converter.

By means of program control, register 19 can be loaded with a corresponding D factor.

The control circuit of FIG. 4 replaces a multiple shift register circuit for controlling printing heads with electrodes arranged on a slope, and it considerably reduces the amount of circuits involved.

Furthermore, this circuit takes into consideration a freely selectable shift factor D depending on the electrode staggering in a printing head. The circuit is thus variable and universally applicable for a great variety of printing heads with different electrode staggering.

While the invention has been particularly shown and described with reference to a preferred embodiment thereof, it will be understood by those skilled in the art that various changes in form and details may be made therein without departing from the spirit and scope of the invention.

What is claimed is:

1. In a printing apparatus having a plurality of activatable elements each responsive to data from a main store for recording marks along a print line in a predetermined marking row and being staggered different distances along said print line, a circuit for controlling the activation of said elements comprising:
   buffer storage means having a plurality of storage cells each addressable by row and column counts;
   row counter means for cyclically addressing each said row of said buffer storage means; and
   column means for addressing each said column in said buffer storage means, said column means including:
   bistable means responsive to each cycle of said row counter for changing from one stable state to the other;

second counter means responsive to said bistable means in said one state for incrementing the count of said counter means;

multiplier means responsive to said bistable means being in one said state for forming products of a constant D and the count of said row counter and being disabled by said bistable means being in the other said state; and adder means for adding the output value of said second counter means and said products for addressing said buffer storage columns.

2. Apparatus as described in claim 1 wherein said multiplier means includes register means settable with different values of said constant D.

3. Apparatus as described in claim 1 wherein said row counter means said second counter means are cyclically operating binary counters.

4. Apparatus as described in claim 2 wherein the value of the constant in said register means is directly related to the distance between said elements.

5. Apparatus as described in claim 1 wherein said buffer storage has a minimum number of columns M according to $M \geq (n-1)D$ where n is the number of electrodes and D represents the units of electrode width between adjacent electrodes along the print line.

6. Apparatus as described in claim 1 wherein said adder means is operable for addressing a single column of said buffer storage means during alternate cycles of said row counter means.

* * * * *